United States Patent
Cho et al.

(10) Patent No.: US 11,485,177 B2
(45) Date of Patent: Nov. 1, 2022

(54) PNEUMATIC TIRE WITH BEAD FILLER APPLIED WITH MULTIPLE RUBBER LAYER

(71) Applicant: HANKOOK TIRE & TECHNOLOGY CO., LTD, Seoul (KR)

(72) Inventors: Young Jun Cho, Daejeon (KR); Chang Hyo Hong, Daejeon (KR)

(73) Assignee: HANKOOK TIRE & TECHNOLOGY CO., LTD, Seoul (KR)

( * ) Notice: Subject to any disclaimer, the term of this patent is extended or adjusted under 35 U.S.C. 154(b) by 14 days.

(21) Appl. No.: 16/676,538

(22) Filed: Nov. 7, 2019

(65) Prior Publication Data

US 2020/0331303 A1    Oct. 22, 2020

(30) Foreign Application Priority Data

Apr. 16, 2019    (KR) .......................... 10-2019-0044090

(51) Int. Cl.
*B60C 15/06*    (2006.01)

(52) U.S. Cl.
CPC .. *B60C 15/0607* (2013.01); *B60C 2015/0621* (2013.01)

(58) Field of Classification Search
CPC ............ B60C 15/0009; B60C 15/0603; B60C 2015/009; B60C 15/0607; B60C 2015/061; B60C 2015/0625; B60C 2015/0617
See application file for complete search history.

(56) References Cited

FOREIGN PATENT DOCUMENTS

| EP | 2322360 A2 | | 5/2011 |
|---|---|---|---|
| EP | 2379356 B1 | | 3/2013 |
| JP | 10024712 A | * | 1/1998 |
| JP | H11320705 A | | 11/1999 |
| JP | 2002178724 A | | 6/2002 |
| JP | 2003011623 A | * | 1/2003 |
| JP | 2003011623 A | | 1/2003 |
| JP | 2005112042 A | | 4/2005 |

(Continued)

OTHER PUBLICATIONS

Machine Translation: JP-2003011623-A, Shindo, Yoshimi, (Year: 2021).*

(Continued)

*Primary Examiner* — Kendra Ly
(74) *Attorney, Agent, or Firm* — Bridgeway IP Law Group, PLLC; Jihun Kim (57) ABSTRACT

A pneumatic tire with a bead filler has a side wall curved at both sides of a tread that is a thick rubber layer that comes in direct contact with a road surface, a bead core seated on a rim of a vehicle, and a bead part having a difference of rubber hardness. The pneumatic tire includes a carcass that is an internal frame of the tire and is provided to be turned up around the bead core of the bead part, in which the bead part includes: a first bead filler that is surrounded by the carcass and a turned-up carcass inside the tire; and a second bead filler that is disposed between the outer side of the turned-up carcass, the side wall, and the rim, and is applied with multiple rubber layers composed of different kinds of rubber layers to reduce weight and improve rolling resistance.

11 Claims, 6 Drawing Sheets

(56) References Cited

FOREIGN PATENT DOCUMENTS

| | | |
|---|---|---|
| JP | 4521120 B2 | 8/2010 |
| JP | 2011218972 A | 11/2011 |
| JP | 5519380 B2 | 6/2014 |
| JP | 5944826 B2 | 7/2016 |
| JP | 6249522 B2 | 12/2017 |
| KR | 10-0578101 B1 | 5/2006 |
| WO | 2018011515 A1 | 1/2018 |

OTHER PUBLICATIONS

Machine Translation: JP-10024712-A, Kobayashi, Yasuhiko, (Year: 2021).*

* cited by examiner

"PRIOR ART"

"Prior Art"

FIG. 4B

PNEUMATIC TIRE WITH BEAD FILLER APPLIED WITH MULTIPLE RUBBER LAYER

CROSS-REFERENCE TO RELATED APPLICATION

This application claims priority to KR 10-2019-0044090, filed Apr. 16, 2019, the disclosure of which is incorporated herein by reference in its entirety.

BACKGROUND OF THE INVENTION

Field of the Invention

The present invention relates to a pneumatic tire with a bead filler and, more particularly, to a pneumatic tire with a bead filler applied with multiple rubber layers, the pneumatic tire being able to control deformation at respective positions on the bead filler by forming the bead filler with multiple rubber layers.

Description of the Related Art

In general, a tire is largely divided into: a tread that is a rubber layer coming in contact with a road surface; a carcass that is a code layer inside the tire, supports load, resists shock, has high fatigue resistance against bending and stretching during driving, and forms the frame of the tire; a bead that seats the tire on a rim of a vehicle; and a side wall that is the side of the tire, protects the carcass, and flexibly bends and stretches.

Such tires have been developed for high performance and light weight, but accidents occurred due to insufficient durability of the bead with an increase in weight and a decrease in weight of vehicles.

Accordingly, a double bead structure was manufactured to reinforce the bead in the related art, but although the structure can improve durability, but there is a problem of increases in weight and rolling resistance.

Accordingly, there is a need for a tire that can control deformation at respective positions on a bead in order to solve this problem.

CITATION LIST

Patent Literature

Korean Patent No. 10-0578101 (May 2, 2006)

SUMMARY OF THE INVENTION

An object of the present invention is to provide a pneumatic tire with a bead filler applied with multiple rubber layers, the pneumatic tire being able to control deformation at respective positions on the bead filler by forming a second bead filler with multiple rubber layers, thereby being able to reduce weight and improve rolling resistance, and reduce compressive deformation and shear deformation of a bead part by moving the line a turned-up carcass to the inside.

The objects to implement in the present invention are not limited to the technical problems described above and other objects that are not stated herein will be clearly understood by those skilled in the art from the following specifications.

In order to achieve the objects, a pneumatic tire with a bead filler applied with multiple rubber layers according to the present invention has a side wall curved at both sides of a tread that is a thick rubber layer that comes in direct contact with a road surface, a bead core seated on a rim of a vehicle, and a bead part having a difference of rubber hardness. The pneumatic tire includes a carcass that is an internal frame of the tire and is provided to be turned up around the bead core of the bead part, in which the bead part includes: a first bead filler that is surrounded by the carcass and a turned-up carcass inside the tire; and a second bead filler that is disposed between the outer side of the turned-up carcass, the side wall, and the rim, and is applied with multiple rubber layers composed of different kinds of rubber layers to reduce weight and improve rolling resistance.

In an embodiment of the present invention, the second bead filler has a long cross-section that narrows toward the upper end and the lower end and is disposed in a shape of which the upper end is inclined toward the outside of the tire with respect to the radial direction of the tire.

In an embodiment of the present invention, the second bead filler may have a first filler portion where the upper end is positioned in the longitudinal direction of the cross-section, a third filler portion where the lower end is positioned in the longitudinal direction of the cross-section, and a second filler portion connected between the first filler portion and the third filler portion.

In an embodiment of the present invention, the first filler portion, the second filler portion, and the third filler portion of the second bead filler may be made of different kinds of rubber layers to reduce weight and improve rolling resistance, thereby controlling deformation at respective positions on the second bead filler.

In an embodiment of the present invention, the first filler portion may have modulus of 3.70E+07 and loss tangent of 0.22, the second filler portion may have modulus of 6.00E+06 and loss tangent of 0.7, and the third filler portion may have modulus of 7.00E+06 and loss tangent of 0.12, in which the filler portion may be made of rubber layers having other modulus and loss tangent, depending on the degree of deformation of the tire.

In an embodiment of the present invention, the upper end of the first filler portion may be disposed to be tangent to a second straight line portion having an angle of 10 to 30 degrees from a first straight line portion connected in parallel with the width direction of the tire from the intersection of a maximum width of the tire and a maximum height of the tire.

In an embodiment of the present invention, the lower end of the first filler portion and the upper end of the second filler portion may be disposed to be tangent to a third straight line portion having an angle of 10 to 25 degrees from the second straight line portion around the intersection.

In an embodiment of the present invention, the lower end of the second filler portion and the upper end of the third filler portion may be disposed to be tangent to a fourth straight line portion having an angle of 10 to 30 degrees from the third straight line portion around the intersection.

In an embodiment of the present invention, the lower end of the third filler portion may be disposed to be tangent to a fifth straight line portion having an angle of 10 to 30 degrees from the fourth straight line portion around the intersection.

In an embodiment of the present invention, the second bead filler may have a first tangential line portion that is parallel with the height direction of the tire at the point where the fifth straight line portion and the turned-up carcass meet, and the lower end of the third filler portion may be disposed to be tangent to the first tangential line portion.

In an embodiment of the present invention, the second bead filler may have a second tangential line portion having an inclination of 0 to 5 degrees from the first tangential line portion outward from the tire, and the upper end of the third filler portion and the lower end of the second filler portion may be disposed at the turned-up carcass that is tangent to the second tangential line portion.

In an embodiment of the present invention, the second bead filler may have a third tangential line portion having an inclination of 0 to 8 degrees from the second tangential line portion outward from the tire, and the upper end of the second filler portion and the lower end of the first filler portion may be disposed at the turned-up carcass that is tangent to the third tangential line portion.

In an embodiment of the present invention, the second bead filler may have a fourth tangential line portion having an inclination of 0 to 10 degrees from the third tangential line portion outward from the tire, and the upper end of the first filler portion may be disposed at the turned-up carcass that is tangent to the fourth tangential line portion.

DETAILED DESCRIPTION OF THE PREFERRED EMBODIMENTS

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments are described in detail with reference to the accompanying drawings.

Figure 1:
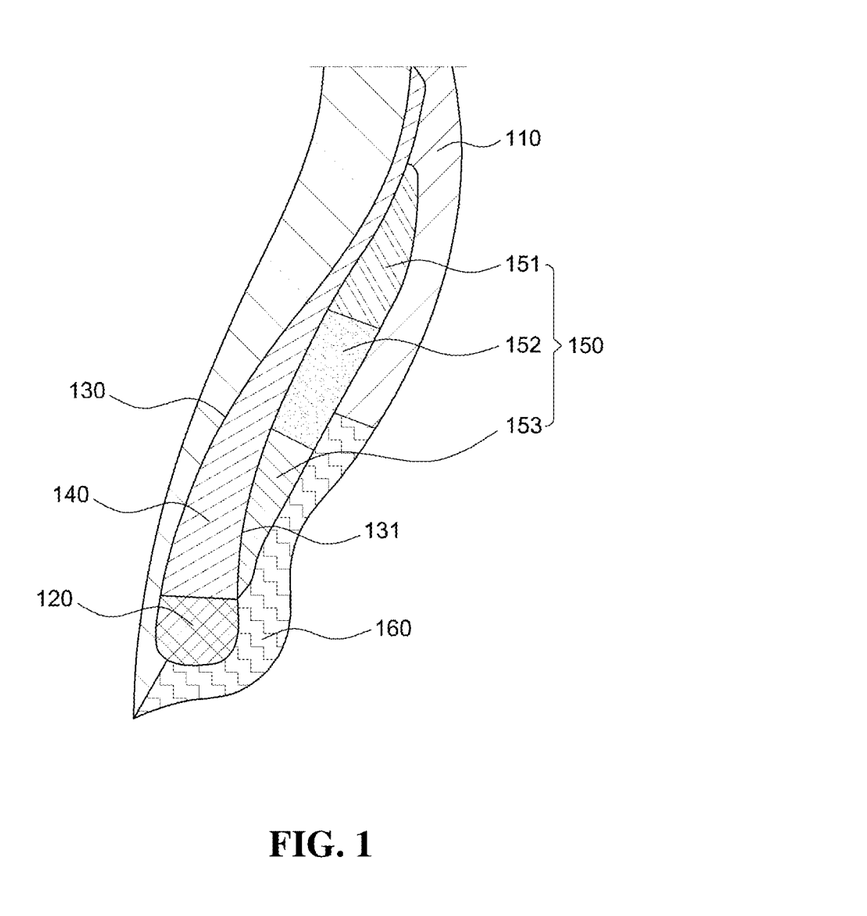
FIG. 1 is a cross-sectional view of a pneumatic tire with a bead filler applied with multiple rubber layers according to an embodiment of the present invention.
Figure 2:
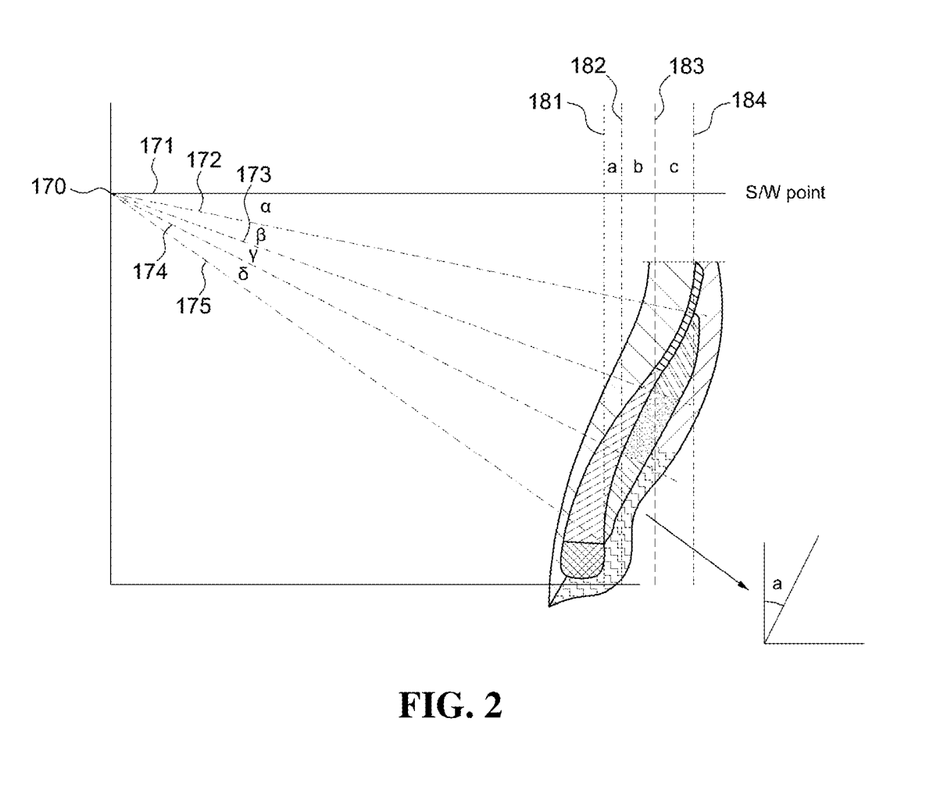
FIG. 2 is a cross-sectional view of a pneumatic tire with a bead filler applied with multiple rubber layers having a straight line portion and a tangential line portion according to an embodiment of the present invention.

FIG. 1 is a cross-sectional view of a pneumatic tire with a bead filler applied with multiple rubber layers according to an embodiment of the present invention, and FIG. 2 is a cross-sectional view of a pneumatic tire with a bead filler applied with multiple rubber layers having a straight line portion and a tangential line portion according to an embodiment of the present invention.

Referring to FIGS. 1 and 2, a pneumatic tire 100 with a bead filler applied with multiple rubber layers according to an embodiment of the present invention include: a side wall 110 curved at both sides of a tread that is a thick rubber layer that comes in direct contact with a road surface; a bead core 12 seated on a rim of a vehicle; and a bead part having a difference of rubber hardness, in which the bead part surrounds the bead core 120 and the bead filler, a carcass 130 surrounds the outer side of the bead part, and a rim cushion 160 is disposed outside the carcass. The pneumatic tire 100 includes a carcass 130 that is an internal frame of the tire and is provided to be turned up around the bead core 120 of the bead part, and the bead part includes: a first bead filler 140 that is surrounded by the carcass 130 and a turned-up carcass 132 inside the tire; and a second bead filler 150 that is disposed between the outer side of the turned-up carcass 131, the side wall 110, and the rim, and is applied with multiple rubber layers composed of different kinds of rubber layers to reduce weight and improve rolling resistance.

The pneumatic tire 100 with a bead filler applied with multiple rubber layers according to an embodiment of the present invention includes the carcass 130.

In more detail, the carcass 130 is the internal frame of the tire and is provided to be turned up around the bead core 120 of the bead part.

Further, the bead part includes the first bead filler 140 and the second bead filler 150.

In more detail, the first bead filler 140 is disposed to surround the carcass 130 and the turned-up carcass 131 inside the tire.

That is, the carcass 130 is turned up toward the outside of the tire around the bead core 120, in which the first bead filler 140 is disposed between the carcass 130 and the turned-up carcass 131 inside the tire.

Accordingly, the first bead filler 140 is surrounded by the carcass 130, and can attenuate external shock and prevent deformation of the bead part due to large load.

Further, the second bead filler 150 is disposed between the outer side of the turned-up carcass 131, the side wall 110, and the rim cushion 160, and is applied with multiple rubber layers composed of different kinds of rubber layers to reduce weight and improve rolling resistance.

In more detail, the second bead filler 150 is disposed between the outer side of the turned-up carcass 131 and the side wall 110 and the rim cushion 160 disposed outside the tire. That is, the inner side of the second bead filler 150 is in contact with the outer side of the turned-up carcass 131, and the upper portion of the outer side of the second bead filler 150 is surrounded by the side wall 110 and the lower portion thereof is surrounded by the rim cushion 160.

Accordingly, the second bead filler 150 can attenuate external shock between the outer side of the carcass 130 and the side wall 110 and the rim cushion 160 and can prevent deformation of the bead part due to large load.

Further, the second bead filler 150 has a long cross-section that narrows toward the upper end and the lower end and may be disposed in a shape of which the upper end is inclined toward the outside of the tire with respect to the radial direction of the tire.

In more detail, the second bead filler 150 has a cross-section that is elongated in the height direction of the tire and the elongated shape narrows toward the upper end and the lower end. Further, in the cross-sectional shape, the upper end faces the outside of the tire and the lower end faces the bead core 120 with respect to the radial direction of the tire.

Further, the second bead filler 150 has a first filler portion 151 where the upper end is positioned in the longitudinal direction of the cross-section, a third filler portion 153 where the lower end is positioned in the longitudinal direction of the cross-section, and a second filler portion 152 connected between the first filler portion 151 and the third filler portion 153.

In more detail, the second bead filler 150 is composed of three different kinds of materials, the first filler portion 151 is disposed at the upper end of the second bead filler 150, the third filler portion 153 is disposed at the lower end of the second bead filler 150, and the second filler portion 152 is positioned between the first filler portion 151 and the third filler portion 152 to be connected thereto.

Accordingly, since the first filler portion 151, the second filler portion 152, and the third filler portion 153 are made of different kinds of materials, it is possible to control deformation of the tire in accordance with stress from the outside.

Further, the first filler portion 151 has modulus of 3.70E+07 and loss tangent Tans of 0.22, the second filler portion 152 has modulus of 6.00E+06 and loss tangent of 0.7, and the third filler portion 153 has modulus of 7.00E+06 and loss tangent of 0.12, in which they may be made of rubber layers having other modulus and loss tangent, depending on the degree of deformation of the tire.

In more detail, the different external stress is applied to the first filler portion 151, second filler portion 152, and third filler portion 153, depending on their positions, and accordingly, the durability and deformation of the tire are changed. Accordingly, it is possible to control deformation of the tire by adjusting the modulus and loss tangent of the first filler portion 151, second filler portion 152, and third filler portion 153.

That is, by setting high modulus and low loss tangent at a portion with large deformation, it is possible to reduce side deformation and show the advantage of unique characteristics of rubber material.

Further, the upper end of the first filler portion 151 is disposed to be tangent to a second straight line portion 172 having an angle α of 10 to 30 degrees from a first straight line portion 171 connected in parallel with the width direction of the tire from the intersection 170 of the maximum width S/W point of the tire and the maximum height OD point of the tire.

In more detail, the point where the maximum width of the tire and the maximum height of the tire meet is defined as the intersection 170, the first straight line portion 171 is formed from the defined intersection 170 in parallel with the width direction of the tire, and the first filler portion 151 is disposed such that the upper end thereof is tangent to the second straight line portion 172 to have an angle of 10 to 30 degrees from the first straight line portion 171 around the intersection 170. That is, the upper end of the first filler portion 151 is disposed at the point where it meets the second straight line portion 172 and the turned-up carcass 131.

Further, the lower end of the first filler portion 151 and the upper end of the second filler portion 152 are disposed to be tangent to a third straight line portion 173 having an angle β of 10 to 25 degrees from the second straight line portion 172 around the intersection 170.

In more detail, the third straight line portion 173 is formed to have an angle of 10 to 25 degrees from the second straight line portion 172 around the intersection 170. The lower end of the first filler portion 151 and the upper end of the second filler portion 152 are disposed to be tangent to the third straight line portion 173.

That is, the lower end of the first filler portion 151 and the upper end of the second filler portion 152 are connected to each other, and the third straight line portion 173 is the reference that divides the lower end of the first filler portion 151 and the upper end of the second filler portion 152.

Further, the lower end of the second filler portion 152 and the upper end of the third filler portion 153 are disposed to be tangent to a fourth straight line portion 174 having an angle γ of 10 to 30 degrees from the third straight line portion 173 around the intersection 170.

In more detail, the fourth straight line portion 173 is formed to have an angle of 10 to 30 degrees from the third straight line portion 173 around the intersection 170. The lower end of the second filler portion 152 and the upper end of the third filler portion 153 are disposed to be tangent to the fourth straight line portion 174.

That is, the lower end of the second filler portion 152 and the upper end of the third filler portion 153 are connected to each other, and the fourth straight line portion 174 is the reference that divides the lower end of the second filler portion 152 and the upper end of the third filler portion 153.

Further, the lower end of the third filler portion 153 is disposed to be tangent to a fifth straight line portion 175 having an angle δ of 10 to 30 degrees from the fourth straight line portion 174 around the intersection 170.

In more detail, the fifth straight line portion 175 is formed to have an angle of 10 to 30 degrees from the fourth straight line portion 174 around the intersection 170. The lower end of the third filler portion 153 is disposed to be tangent to the fifth straight line portion 175.

Accordingly, the first filler portion 151, the second filler portion 152, and the third filler portion 153 are disposed to be divided by the first straight line portion 171, the second straight line portion 172, the third straight line portion 173, the fourth straight line portion 174, and the fifth straight line portion 175, so it is possible to reduce the weight and improve rolling resistance of the tire by controlling deformation at respective positions in accordance with the degree of deformation of the tire.

Further, the second bead filler 150 has a first tangential line portion 181 that is parallel with the height direction of the tire at the point where the fifth straight line portion 175 and the turned-up carcass 131 meet, and the lower end of the third filler portion 153 is disposed to be tangent to the first tangential line portion 181.

In more detail, the first tangential line portion 181 is formed in parallel with the height direction of the tire at the point where the fifth straight line portion 175 and the turned-up carcass 131 meet, the lower end of the third filler portion 153 is disposed at the first tangential line portion 181.

Further, the second bead filler 150 has a second tangential line portion 182 having an inclination a of 0 to 5 degrees from the first tangential line portion 181 outward from the tire, and the upper end of the third filler portion 153 and the lower end of the second filler portion 152 are disposed at the turned-up carcass 131 that is tangent to the second tangential line portion 182.

In more detail, the second tangential line portion 182 is formed to have an inclination of 0 to 5 degrees from the first tangential line portion 181 outward from the tire, and is disposed with the upper end of the third filler portion 153 and the lower end of the second filler portion 152.

That is, the upper end of the third filler portion 153 and the lower end of the second filler portion 152 that are in contact with the turned-up carcass 131 can be set on the basis of the second tangential line portion 182.

Further, the second bead filler 150 has a third tangential line portion 182 having an inclination b of 0 to 8 degrees from the second tangential line portion 182 outward from the tire, and the upper end of the second filler portion 152 and the lower end of the first filler portion 151 are disposed at the turned-up carcass 131 that is tangent to the third tangential line portion 183.

In more detail, the third tangential line portion 183 is formed to have an inclination of 0 to 8 degrees from the second tangential line portion 182 outward from the tire, and is disposed with the upper end of the second filler portion 152 and the lower end of the first filler portion 151.

That is, the upper end of the second filler portion 152 and the lower end of the first filler portion 151 that are in contact with the turned-up carcass 131 can be set on the basis of the third tangential line portion 183.

Further, the second bead filler 150 has a fourth tangential line portion 184 having an inclination c of 0 to 10 degrees from the third tangential line portion 183 outward from the tire, and the upper end of the first filler portion 151 is disposed at the turned-up carcass 131 that is tangent to the fourth tangential line portion 184.

In more detail, the fourth tangential line portion 184 is formed to have an inclination of 0 to 10 degrees from the third tangential line portion 183 outward from the tire and is disposed with the upper end of the first filler portion 151.

That is, the upper end of the first filler portion 151 that is in contact with the turned-up carcass 131 can be set on the basis of the fourth tangential line portion 184.

Figure 3A:
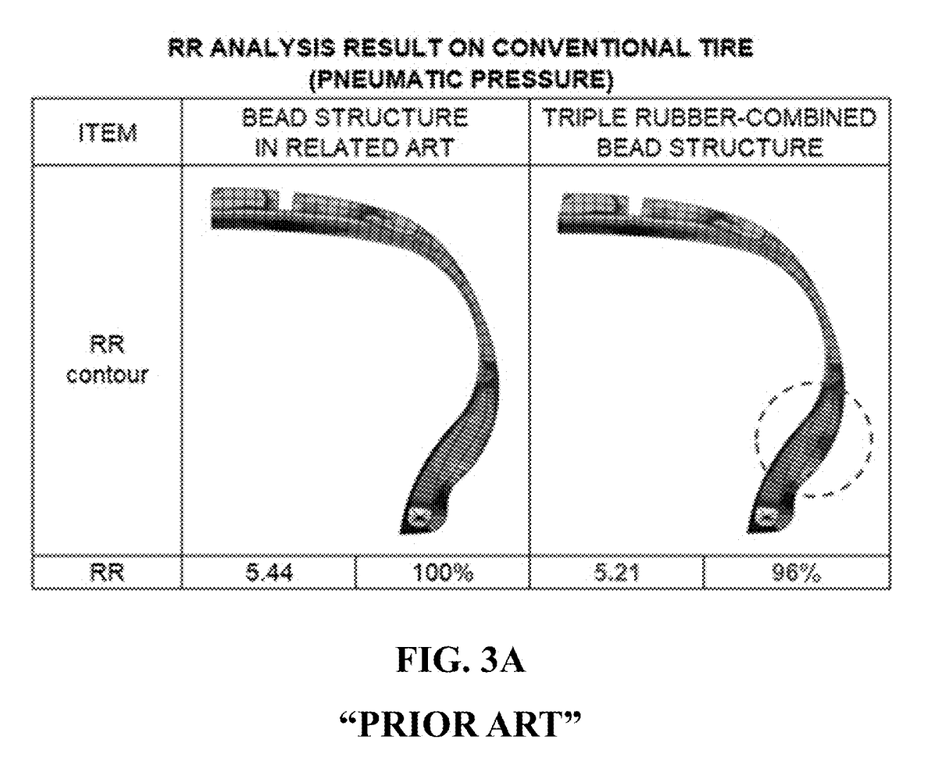
FIG. 3A is a view showing a result of analyzing rolling resistance in a bead structure of the related art.
Figure 3B:
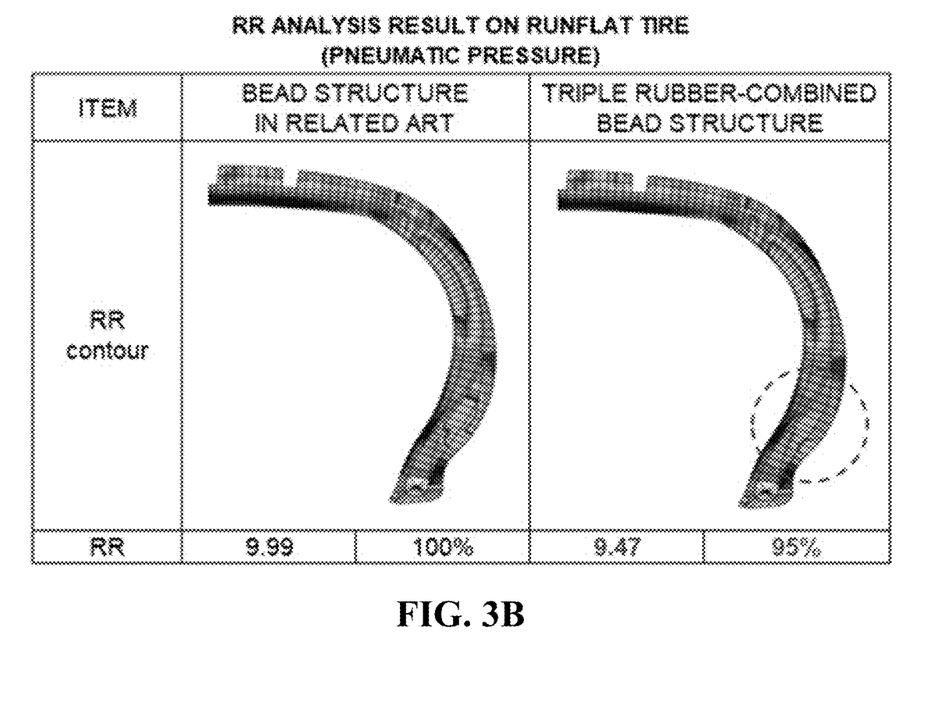
FIG. 3B is a view showing a result of analyzing rolling resistance in a bead structure applied with multiple rubber layers according to the present invention.

FIGS. 3A and 3B are respective views showing results of analyzing rolling resistance in a bead structure of the related art and a bead structure of a tire applied with multiple rubber layers according to the present invention.

Referring to FIGS. 3A and 3B, it can be seen that, as compared with a bead structure applied with one rubber layer of the related art in a conventional tire and runflat tire, deformation is reduced and rolling resistance is improved by applying the bead structure of a tire applied with multiple rubber layers at a portion with large deformation.

Figure 4A:
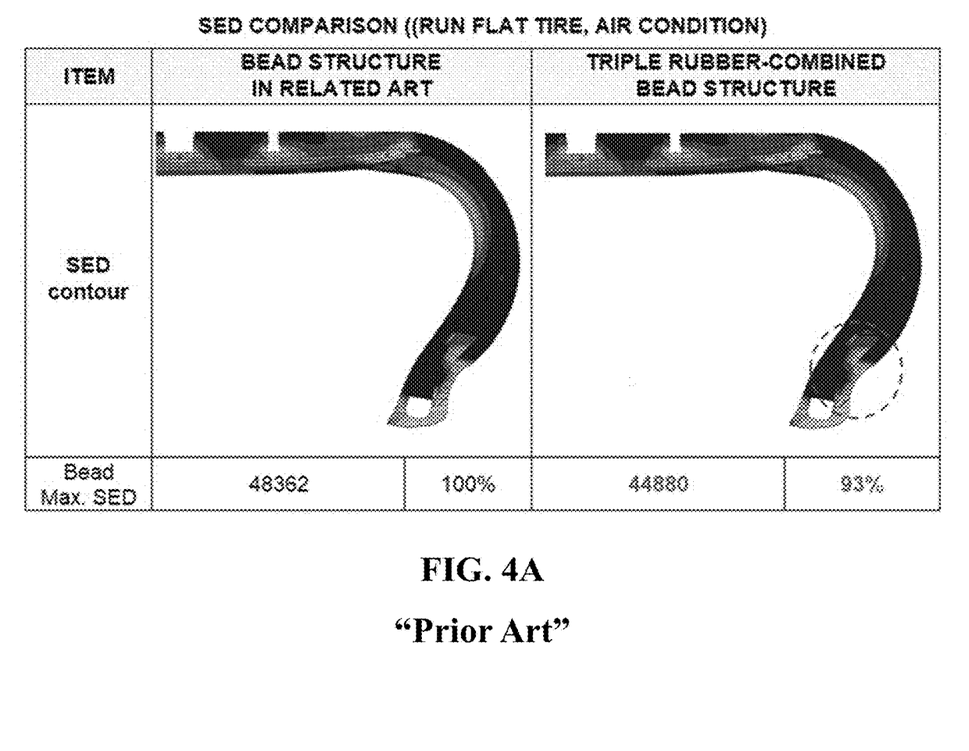
FIG. 4A is a view showing an SED analysis result under pneumatic pressure of a runflat tire and zero pressure in a bead structure of the related art.
Figure 4B:
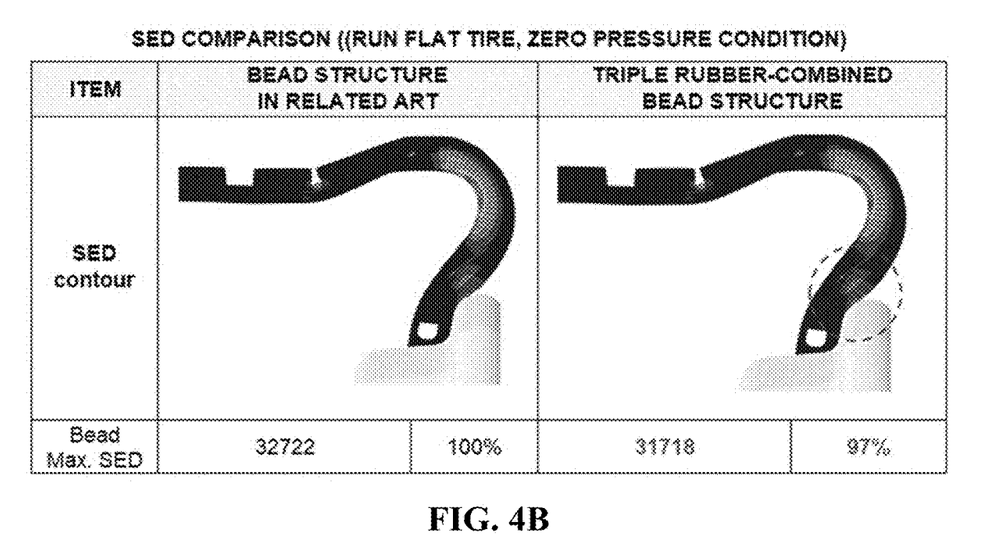
FIG. 4B is a view showing an SED analysis result in a bead structure applied with multiple rubber layers according to the present invention.

FIGS. 4A and 4B are respective views showing an SED analysis result under pneumatic pressure of a runflat tire and zero pressure in a bead structure of the related art and a bead structure of a tire applied with multiple rubber layers according to the present invention.

Referring to FIGS. 4A and 4B, as compared with the bead structure of the related art, as for both pneumatic pressure and a flat state, the bead structure applied with multiple rubber layers according to the present invention can reduce compressive deformation of an SIR portion, and as for deformation at respective positions on the bead portion, optimal deformation can be induced for respective characteristics of the tire.

Accordingly, the bead structure of a tire applied with multiple rubber layers of the present invention, it is possible to reduce the weight and improve rolling resistance including durability by forming the second filler portion 152 with multiple rubber layers in accordance with durability and the characteristics of the tire.

Further, it is possible to freely dispose multiple rubber layers at positions with low durability and control deformation at respective positions on the second filler portion 150.

According to the present invention, the pneumatic tire with a bead filler applied with multiple rubber layers has an effect that it is possible to control deformation at respective positions on the bead filler by forming a second bead filler with multiple rubber layer, thereby being able to reduce weight and improve rolling resistance, and reduce compressive deformation and shear deformation of a bead part by moving the line a turned-up carcass inside.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A pneumatic tire comprising:
   a tread configured to come in contact with a road surface;
   a side wall extending from the tread and having a curved side surface;
   a bead core configured to be seated on a rim of a vehicle;
   a carcass disposed to be turned up around the bead core;
   a turned-up carcass disposed inside the tire;
   a first bead filler surrounded by the carcass and the turned-up carcass; and
   a second bead filler disposed between the turned-up carcass and the side wall,
   wherein the second bead filler has a first filler portion, a second filler portion, and a third filler portion connected in series from a top to a bottom of the second bead filler,
   wherein the first filler portion, the second filler portion, and the third filler portion have different rubber materials from each other,
   wherein a first, a second, and a third straight lines extended from an intersection point of a maximum width line and a maximum height line of the tire are respectively tangent to an upper end of the first filler portion, an upper end of the second filler portion, and an upper end of the third filler portion, and
   wherein the upper end of the second filler portion has an end surface formed on the second straight line such that an angle of the second straight line with respect to the maximum width line is equal to an angle of the entire end surface of the upper end of the second filler portion with respect to the maximum width line, and the upper end of the third filler portion has an end surface formed on the third straight line such that an angle of the third straight line with respect to the maximum width line is equal to an angle of the entire end surface of the upper end of the third filler portion with respect to the maximum width line.

2. The pneumatic tire of claim 1, wherein the second bead filler has a cross-section that narrows toward an upper end and a lower end thereof, and wherein the upper end of the second bead filler is inclined toward an outside of the tire with respect to a radial direction of the tire.

3. The pneumatic tire of claim 1, wherein the first straight line tangent to the upper end of the first filler has an angle of 10 to 30 degrees with respect to the maximum width line of the tire.

4. The pneumatic tire of claim 3, wherein the second straight line tangent to the upper end of the second filler portion has an angle of 10 to 25 degrees with respect to the first straight line tangent to the upper end of the first filler portion.

5. The pneumatic tire of claim 4, wherein the third straight line tangent to the upper end of the third filler portion has an angle of 10 to 30 degrees with respect to the second straight line tangent to the upper end of the second filler portion.

6. The pneumatic tire of claim 5, wherein a fourth straight line extended from the intersection point is tangent to a lower end of the third filler portion and has an angle of 10 to 30 degrees with respect to the third straight line tangent to the upper end of the third filler portion.

7. The pneumatic tire of claim 6, wherein the second bead filler contacts a first line, parallel to the maximum height line of the tire, at a point where the fourth straight line tangent to the lower end of the third filler portion and the turned-up carcass meet.

8. The pneumatic tire of claim 7, wherein the second bead filler contacts a second line, having an inclination of 0 to 5 degrees from the first line, at a point where the third straight line tangent to the upper end of the third filler portion and the turned-up carcass meet.

9. The pneumatic tire of claim 8, wherein the second bead filler contacts a third line, having an inclination of 0 to 8 degrees from the second line, at a point where the second straight line tangent to the upper end of the second filler portion and the turned-up carcass meet.

10. The pneumatic tire of claim 9, wherein the second bead filler contacts a fourth line, having an inclination of 0 to 10 degrees from the third line, at a point where the first straight line tangent to the upper end of the first filler portion and the turned-up carcass meet.

11. A pneumatic tire comprising:
a tread configured to come in contact with a road surface;
a side wall extending from the tread and having a curved side surface;
a bead core configured to be seated on a rim of a vehicle;
a carcass disposed to be turned up around the bead core;
a turned-up carcass disposed inside the tire;
a first bead filler surrounded by the carcass and the turned-up carcass; and
a second bead filler disposed between the turned-up carcass and the side wall,
wherein the second bead filler has a first filler portion, a second filler portion, and a third filler portion connected in series from a top to a bottom of the second bead filler,
wherein the first filler portion, the second filler portion, and the third filler portion have different rubber materials from each other,
wherein a plurality of straight lines extended from an intersection point of a maximum width line and a maximum height line of the tire are respectively tangent to an upper end of the first filler portion, an upper end of the second filler portion, and an upper end of the third filler portion, and
wherein the first filler portion has a loss tangent of 0.22, the second filler portion has a loss tangent of 0.7, and the third filler portion has a loss tangent of 0.12.

* * * * *